(12) United States Patent
Davis (10) Patent No.: US 10,107,123 B2
(45) Date of Patent: Oct. 23, 2018

(54) SLIDING SEAL

(71) Applicant: UNITED TECHNOLOGIES CORPORATION, Farmington, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/769,053

(22) PCT Filed: Aug. 26, 2014

(86) PCT No.: PCT/US2014/052735
§ 371 (c)(1),
(2) Date: Aug. 19, 2015

(87) PCT Pub. No.: WO2015/084441
PCT Pub. Date: Jun. 11, 2015

(65) Prior Publication Data
US 2015/0377051 A1 Dec. 31, 2015

Related U.S. Application Data (60) Provisional application No. 61/872,223, filed on Aug. 30, 2013, provisional application No. 61/872,268, filed on Aug. 30, 2013.

(51) Int. Cl.
*F16J 15/02* (2006.01)
*F01D 11/00* (2006.01)
(Continued)

(52) U.S. Cl.
CPC .......... *F01D 11/005* (2013.01); *F01D 11/003* (2013.01); *F02C 7/28* (2013.01);
(Continued)

(58) Field of Classification Search
CPC ...... F16J 15/067; F16J 15/0887; F16J 15/104; F16J 15/02; F16J 15/46; F16J 15/48;
(Continued)

(56) References Cited

U.S. PATENT DOCUMENTS 2,544,538 A 3/1951 Mahnken et al.
2,941,825 A 6/1960 Heinrich
(Continued)

FOREIGN PATENT DOCUMENTS

| EP | 1566581 A1 | 8/2005 |
|---|---|---|
| JP | 2001200938 A | 7/2001 |
| WO | 0012920 | 3/2000 |

OTHER PUBLICATIONS

European Search Report for Application No. EP 14867717.
(Continued)

*Primary Examiner* — Nathan Cumar
(74) *Attorney, Agent, or Firm* — Cantor Colburn LLP (57) ABSTRACT

The present disclosure relates generally to a sliding seal between two components. At least one of the two components includes a ramped surface on which the sliding seal slides during relative movement between the two components.

11 Claims, 6 Drawing Sheets

(51) Int. Cl.
*F16J 15/06* (2006.01)
*F16J 15/10* (2006.01)
*F02C 7/28* (2006.01)
*F16J 15/08* (2006.01)

(52) U.S. Cl.
CPC ............ *F16J 15/02* (2013.01); *F16J 15/067* (2013.01); *F16J 15/0887* (2013.01); *F16J 15/104* (2013.01); *F05D 2220/32* (2013.01); *F05D 2240/55* (2013.01); *F05D 2260/38* (2013.01); *F05D 2300/176* (2013.01); *F05D 2300/6033* (2013.01)

(58) Field of Classification Search
CPC ........ F01D 11/005; F01D 11/003; F02C 7/28; F05D 2220/32; F05D 2240/55; F05D 2260/38; F05D 2300/176; F05D 2300/6033; Y02T 20/672; Y02T 50/672
USPC ............... 277/647, 395, 458, 530, 566
See application file for complete search history.

(56) References Cited

U.S. PATENT DOCUMENTS

| | | | |
|---|---|---|---|
| 3,893,786 A | 7/1975 | Rahnke et al. | |
| 3,975,114 A | 8/1976 | Kalkbrenner | |
| 4,121,843 A * | 10/1978 | Halling | F01D 11/005 277/647 |
| 4,477,086 A | 10/1984 | Feder | |
| 4,589,666 A * | 5/1986 | Halling | F16L 51/025 277/631 |
| 4,759,555 A | 7/1988 | Halling | |
| 4,915,397 A | 4/1990 | Nicholson | |
| 5,078,412 A | 1/1992 | Baumgarth | |
| 5,158,305 A | 10/1992 | Halling | |
| 5,716,052 A * | 2/1998 | Swensen | F16J 15/0887 277/608 |
| 6,431,825 B1 | 8/2002 | McLean | |
| 6,702,549 B2 | 3/2004 | Tiemann | |
| 7,080,513 B2 * | 7/2006 | Reichert | F01D 9/023 277/628 |
| 7,163,206 B2 | 1/2007 | Cross et al. | |
| 7,303,371 B2 | 12/2007 | Tiemann | |
| 7,389,991 B2 | 6/2008 | Riggi, Jr. et al. | |
| 7,497,443 B1 | 3/2009 | Steinetz et al. | |
| 7,954,823 B2 * | 6/2011 | Horie | F16J 15/3204 277/436 |
| 8,104,772 B2 * | 1/2012 | Halling | F01D 11/005 277/606 |
| 9,169,930 B2 | 10/2015 | Panchal et al. | |
| 9,341,072 B2 | 5/2016 | Hanumanthan et al. | |
| 9,341,120 B2 | 5/2016 | Barry, Jr. et al. | |
| 9,512,735 B2 | 12/2016 | Davis | |
| 9,790,809 B2 | 10/2017 | Dube et al. | |
| 9,850,773 B2 | 12/2017 | Zelesky et al. | |
| 2005/0008473 A1 | 1/2005 | Balsdon | |
| 2005/0082768 A1 | 4/2005 | Iguchi et al. | |
| 2006/0038358 A1 | 2/2006 | James | |
| 2006/0127219 A1 | 6/2006 | Zborovsky | |
| 2007/0297900 A1 | 12/2007 | Abgrall et al. | |
| 2008/0258404 A1 | 10/2008 | Pillhoefer | |
| 2009/0053055 A1 | 2/2009 | Cornett et al. | |
| 2009/0322036 A1 * | 12/2009 | Halling | F01D 11/005 277/434 |
| 2011/0049812 A1 | 3/2011 | Sutcu | |
| 2011/0058953 A1 | 3/2011 | Simon-Delgado et al. | |
| 2012/0235366 A1 * | 9/2012 | Walunj | F01D 5/3007 277/647 |

OTHER PUBLICATIONS

English Abstract for JP2001200938A—Jul. 27, 2001; 2 pgs.
International Search Report for Application No. PCT/US2014/052744; International Filing Date: Aug. 26, 2014; dated Dec. 11, 2014; 3 pgs.
Notification Concerning Transmittal of International Preliminary Report on Patentability (Chapter 1 of the Patent Cooperation Treaty); Application No. PCT/US2014/052744; dated Mar. 10, 2016; 12 pages.
Written Opinion for International Application No. PCT/US2014/052744; International filing date: Aug. 26, 2014; dated Dec. 11, 2014; 10 pgs.
Korean Intellectual Property Office, International Application Division, International Search Report dated May 28, 2015 for PCT/US2014/052735.
Korean Intellectual Property Office, International Application Division, Written Opinion of the International Searching Authority, dated May 28, 2015 for PCT/US2014/052735.

* cited by examiner

SLIDING SEAL

CROSS-REFERENCE TO RELATED APPLICATIONS

The present application is a national stage of and claims the priority benefit of PCT Application Serial No. PCT/US2014/052735, filed Aug. 26, 2014, which claims the priority benefit of U.S. Patent Application Ser. No. 61/872,223 filed Aug. 30, 2013 and U.S. Patent Application Ser. No. 61/872,268 filed Aug. 30, 2013, the text and drawings of which are hereby incorporated by reference in their entireties.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined between first and second components is disclosed, the seal comprising: an annular member having a substantially U-shaped cross section along at least a portion thereof, the portion configured to provide a seal interface at each of the first and second components.

In another embodiment, a seal for sealing a space defined between first and second components is disclosed, the seal comprising: an annular member having a substantially D-shaped cross section along at least a portion thereof, the portion configured to provide a seal interface at each of the first and second components.

In another embodiment, a system is disclosed, comprising: a first component including a first surface; a second component disposed adjacent the first component with the first and second components defining a seal cavity therebetween, the second component including a ramped second surface, wherein the ramped second surface forms an angle of less than 90 degrees with respect to the first surface; and a seal disposed in the seal cavity; wherein the seal is configured to slide on the ramped surface without substantial deflection thereof during relative movement of the first component and the second component toward or away from one another.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
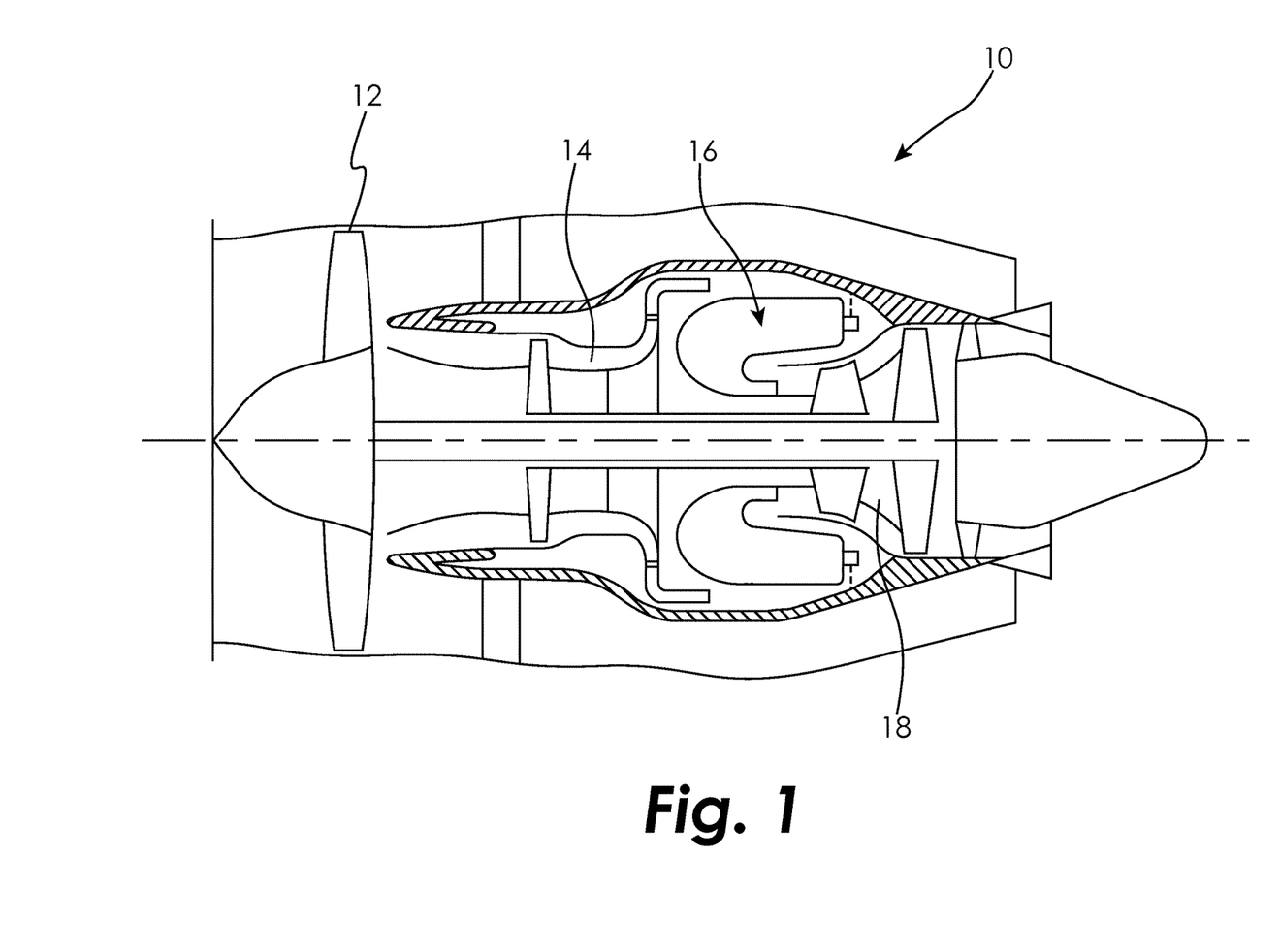
FIG. 1 is a schematic cross-sectional view of a gas turbine engine.

FIG. 1 illustrates a gas turbine engine 10 of a type normally provided for use in propulsion of aircraft or the generation of electric power and bleed air, generally comprising in serial flow communication a fan 12 through which ambient air is propelled, a compressor section 14 for pressurizing a portion of the air (the gas path air), a combustor 16 in which the compressed air is mixed with fuel and ignited for generating a stream of hot combustion gases, and a turbine section 18 for extracting energy from the combustion gases.

Figure 2:
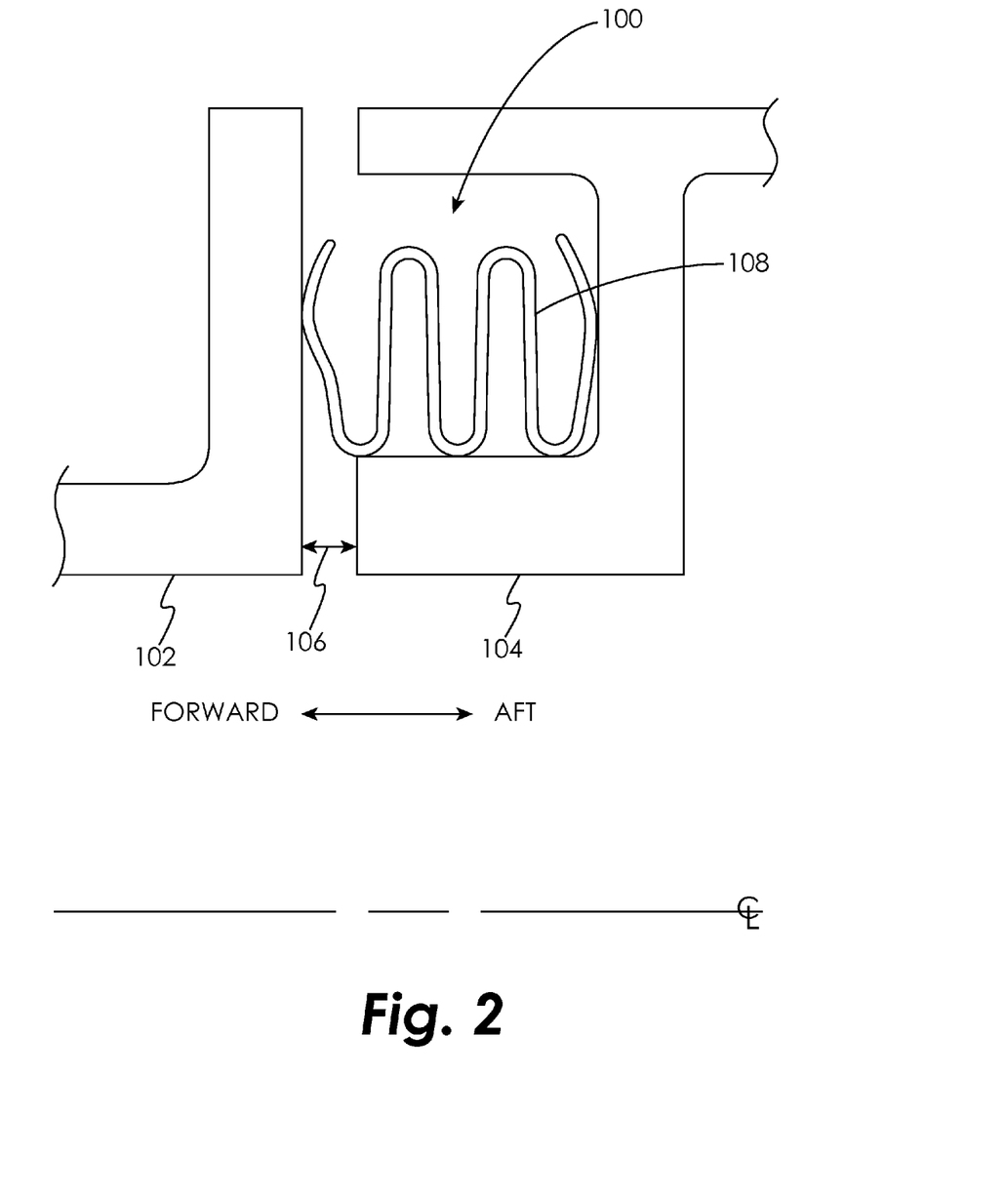
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and/or circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. For example, the seals disclosed herein may be used to seal the circumferential space between a piston and a cylinder wall in which the piston reciprocates. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such a nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
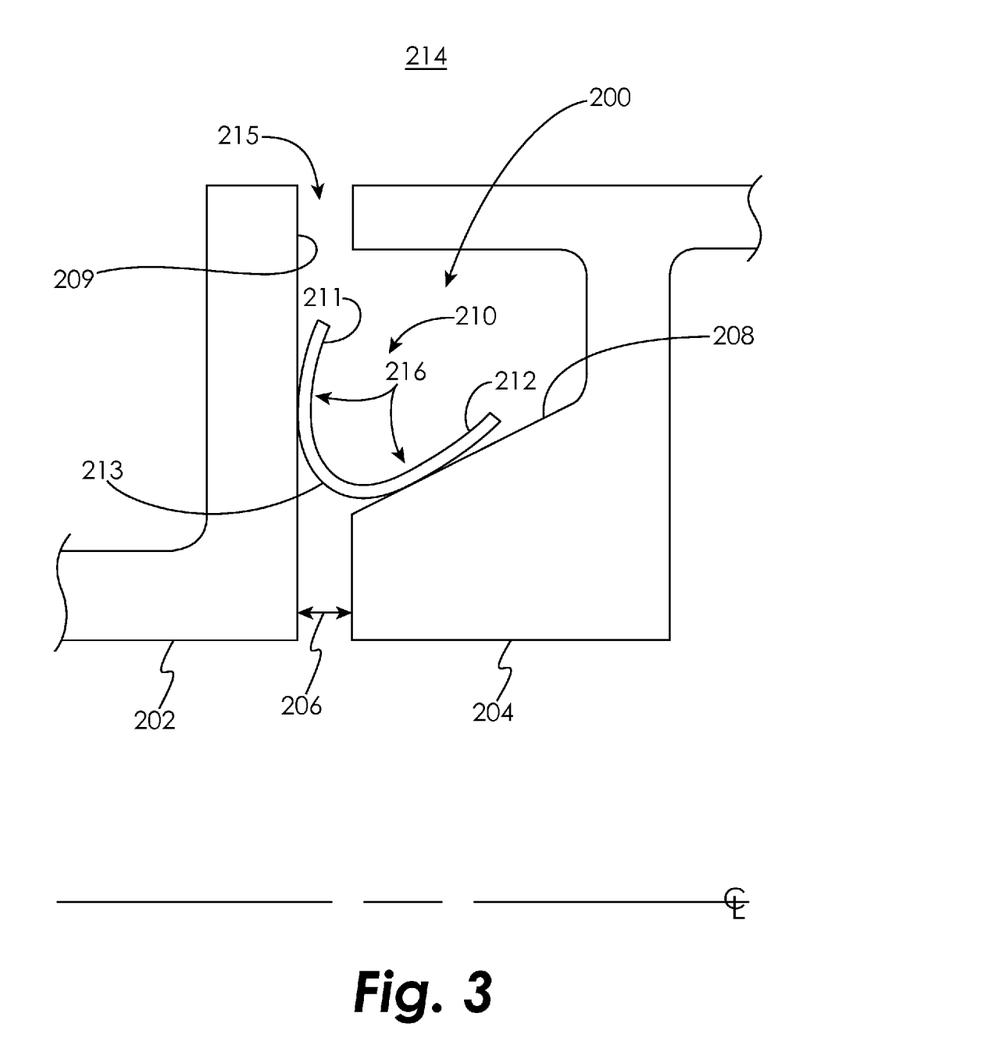
FIG. 3 is a schematic cross-sectional view of a seal and seal cavity in an embodiment.

FIG. 3 schematically illustrates a cross-sectional view of a seal cavity 200 formed by two axially-adjacent segmented or full-hoop turbine components 202 and 204 which may move axially, radially, and circumferentially relative to one another about an axial centerline of the turbine engine. A nominal design clearance 206 exists between the components 202 and 204. At least one side of the seal cavity 200 is formed with a ramped surface 208 that forms an angle of less than 90 degrees with the surface 209 of the component 202. Within the seal cavity 200 lies an annular seal 210 formed from a material appropriate to the anticipated operating conditions of the seal 210, such as a nickel-based alloy to name just one non-limiting example. As can be seen, the seal 210 has a substantially u-shaped cross-section. The seal 210 may include a coating and/or a sheath to provide increased wear resistance.

As used herein, the terms "u-shaped" and "u-shaped cross-section" are intended to encompass a seal having a cross-sectional shape comprising a first arm 211 and a second arm 212 joined by a curved section 213, wherein the first arm 211 is configured to seat against the first component 202 and the second arm 212 is configured to seat against the second component 204. The first arm 211 and the second arm 212 may be substantially straight or curved as shown.

Continuing with reference to FIG. 3, fluid pressure in a secondary flow cavity 214 is transmitted to the seal cavity 200 through an opening 215. This pressure acts upon the surface 216 of the seal 210, thereby causing it to seat (e.g., providing a seating bias) against the components 202 and 204. More specifically, first arm 211 interfaces with surface 209 and second arm 212 interfaces with surface 208 to form respective seals which prevent or limit pressure from being transmitted from secondary flow cavity 214 past the seal 210. As the two components 202 and 204 move relative to each other in the axial and/or radial direction, the seal 210 second arm 212 slides along the ramped surface 208 with little or no deformation, and the pressure forces acting upon the surface 216 load the seal 210 so that the first arm 211 remains in contact with the surface 209 of component 202 and the second arm 212 remains in contact with the surface 208 of component 204 as shown. Therefore, during axial and/or radial movement of the turbine components 202 and 204 relative to one another about an axial centerline of the turbine engine, the first arm 211 may translate in a first direction along the surface 209 of component 202 and the second arm 212 may translate in a second direction along the ramp surface 208 of component 204 without substantial deflection of the seal 210. Therefore, sealing is maintained while the components 202 and 204 move relative to one another. In some embodiments, the first and second directions form an acute angle therebetween. In some embodiments, the first direction is substantially radial with respect to the axial centerline of the turbine engine.

Figure 4:
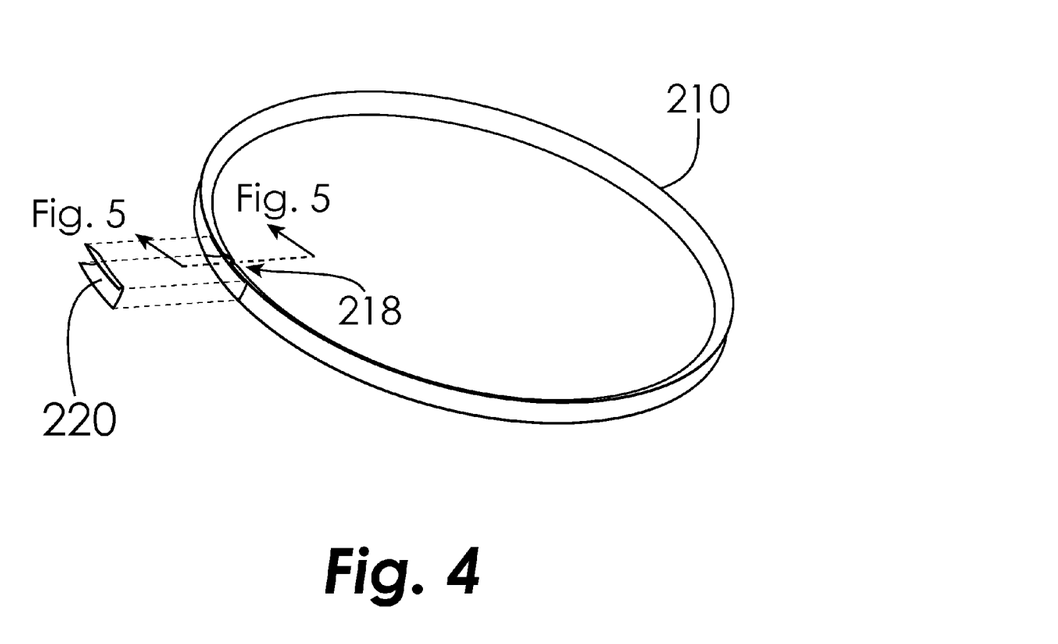
FIG. 4 is a schematic perspective view of a seal in an embodiment.
Figure 5:
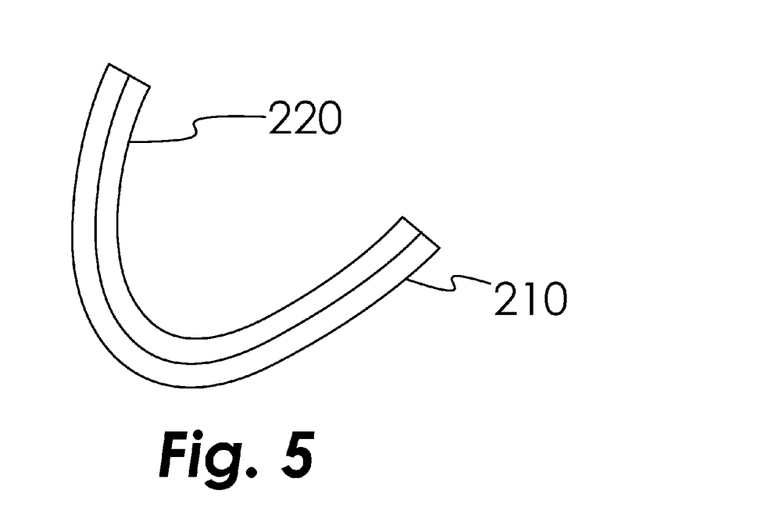
FIG. 5 is a schematic cross-sectional view of a seal and a bridging seal in an embodiment.

As shown in FIG. 4, the annular seal 210 may define a gap 218 therein to allow for expansion and contraction of the seal 210 relative to component 204. As shown in FIG. 5, the gap 218 may be partially or substantially covered by a bridging u-shaped seal 220 that extends a distance on either side of the gap 218. In an embodiment, the bridging seal 220 is a discrete piece and is attached to the seal 210 one side of the gap 218. In another embodiment, the bridging seal 220 is integrally formed with the seal 210 as an extension on one side of the gap 218. The bridging seal 220 nests within a portion of the seal 210 to bridge the gap 218, such that a convex outer surface of the bridging seal 220 faces a concave inner surface of the seal 210 in the area of the gap 218. The concave surfaces of the seal 210 and bridging seal 220 face the high pressure side of the seal cavity 200. The pressure transmitted to the seal cavity 200 will act upon the bridging seal 220 to press in against the seal 210, thereby partially or substantially sealing the gap 218.

Unlike the seal 108, the seal 210 is not deflected as the components 202 and 204 move relative to each other during engine assembly and engine operation, which is beneficial because the seal can be made from a lower strength material that may be lower cost, have higher temperature capability, be more manufacturable, and/or more wear-resistant. Additionally, the seal is less susceptible to distortion or breakage, which can cause leakage of gas past the seal 210 and/or liberation of the seal. The seal 210 is also less complex/costly to produce, and the bridging seal 220 at the gap 218 will be more secure because the added stiffness of the bridging seal 220 does not impact seal functionality as it would with the seal 108 that must be deflected to seal properly. For example, providing a bridging seal to cover a gap in the seal 108 will increase the effective thickness of the seal 108 in the area of the bridging seal. Because the seal 108 must be deflected in order to seal against the surfaces of the seal cavity 100, the added thickness in the area of the bridging seal will increase the stiffness of the seal 108 in this area, reducing its ability to deflect.

Figure 6:
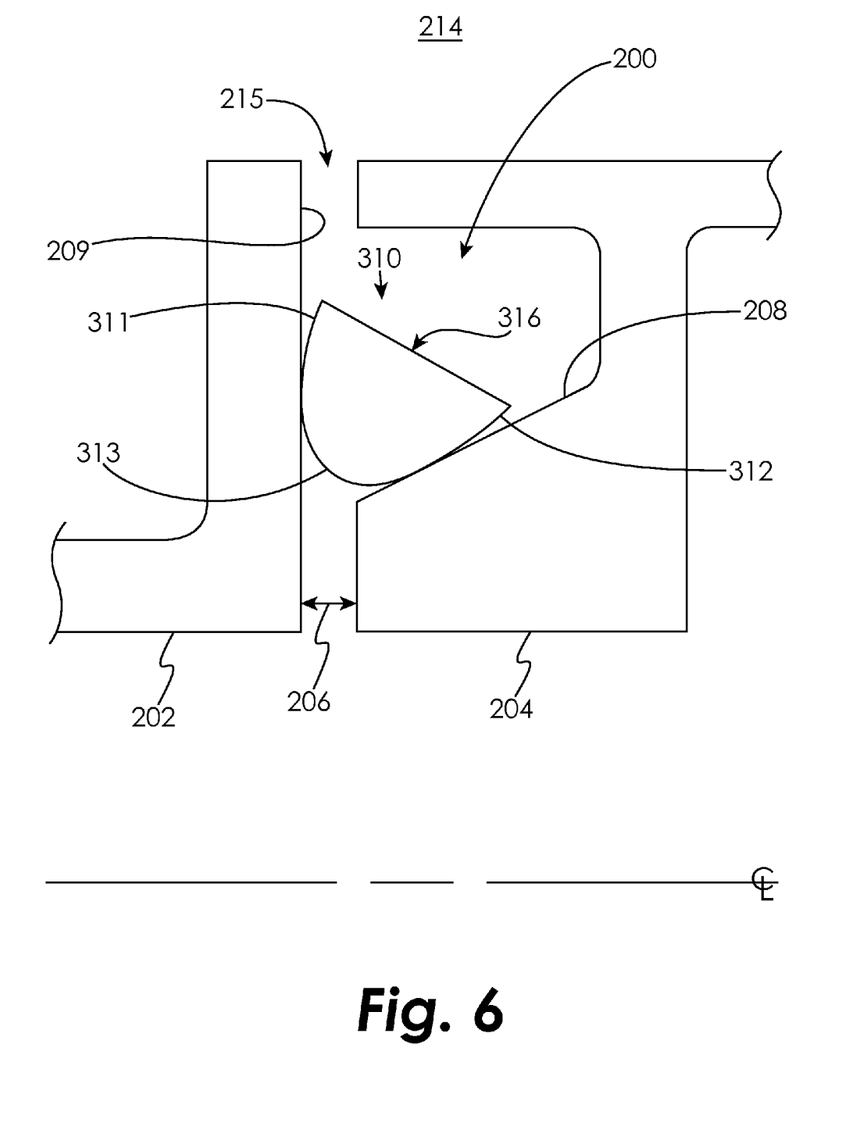
FIG. 6 is a schematic cross-sectional view of a seal and seal cavity in an embodiment.

FIG. 6 schematically illustrates a cross-sectional view of the seal cavity 200 formed by the components 202 and 204. Within the seal cavity 200 lies an annular seal 310 formed from a material appropriate to the anticipated operating conditions of the seal 310, such as a nickel-base alloy to name just one non-limiting example. As can be seen, the seal 310 has a generally D-shaped cross-section. The seal 310 may include a coating and/or a sheath to provide increased wear resistance.

As used herein, the terms "D-shaped" and "D-shaped cross-section" are intended to encompass a seal having a solid cross-sectional shape bounded by a first surface 311 and a second surface 312 joined by a curved section 313 one side and a third surface 316 on another side, wherein the first surface 311 is configured to seat against the first component 202 and the second surface 312 is configured to seat against the second component 204. The first surface 311 and the second surface 312 may be substantially straight or curved, and may be integrally formed with one another as shown.

Pressure in the secondary flow cavity 214 is transmitted to the seal cavity 200 through the opening 215. This pressure acts upon the surface 316 of the seal 310, thereby causing it to seat (e.g., providing a seating bias) against the components 202 and 204. More specifically, the surface 311 interfaces with surface 209 and the surface 312 interfaces with surface 208 to form respective seals which prevent or limit pressure from being transmitted from secondary flow cavity 214 past the seal 310. As the two components 202 and 204 move relative to each other in the axial and/or radial direction, the seal 210 surface 312 slides along the ramped surface 208 with little or no deformation and the pressure forces acting upon the surface 316 load the seal 310 so that the surface 311 remains in contact with the surface 209 of component 202 and the surface 312 remains in contact with the surface 208 of component 204 as shown. Therefore, during axial and/or radial movement of the turbine components 202 and 204 relative to one another about an axial centerline of the turbine engine, the surface 311 may translate in a first direction along the surface 209 of component 202 and the second surface 312 may translate in a second direction along the ramp surface 208 of component 204 without substantial deflection of the seal 310. Therefore, sealing is maintained while the components 202 and 204 move relative to one another. In some embodiments, the first and second directions form an acute angle therebetween. In some embodiments, the first direction is substantially radial with respect to the axial centerline of the turbine engine.

Figure 7:
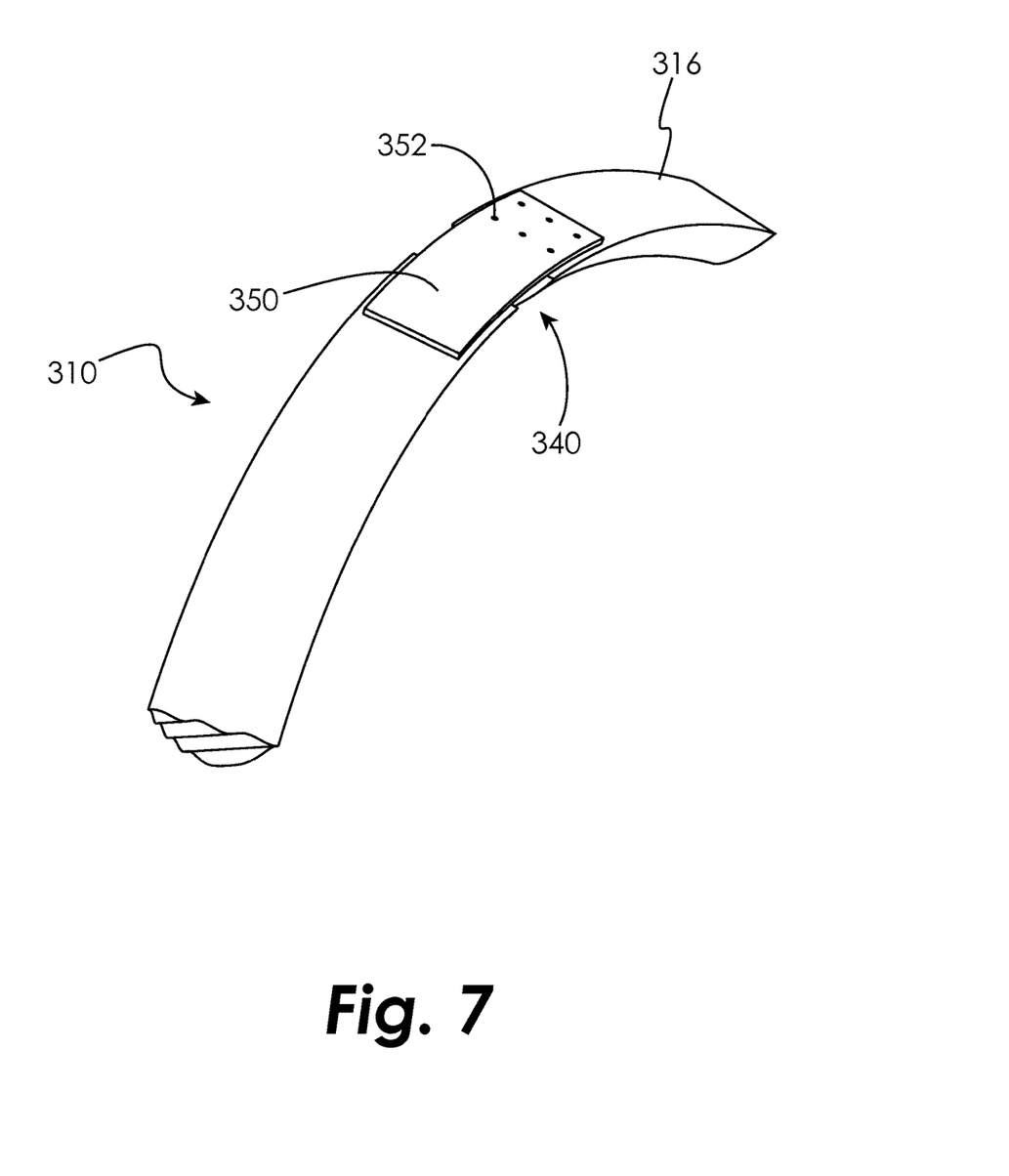
FIG. 7 is a schematic partial perspective view of a seal in an embodiment.

As with the seal 210, the seal 310 may define a gap 340 (See FIG. 7) therein to allow for expansion and contraction of the seal 310 relative to component 204. The gap may be partially covered by a bridging seal 350 that extends a distance on either side of the gap. In an embodiment, the bridging seal 350 comprises a discrete flat metal sheet that is secured to the seal 310 on one side of the gap 340 by any desired means. For example, the bridging seal 350 may be secured to the seal 310 by means of resistance welds 352. In another embodiment, the bridging seal 350 is integrally formed with the seal 310 as an extension on one side of the gap 340. The pressure transmitted to the seal cavity 200 will act upon the bridging seal 350 to press is against the seal 310, thereby partially or substantially sealing the gap 340.

Unlike the seal 108, the seal 310 is not deflected as the components 202 and 204 move relative to each other during engine assembly and engine operation, which is beneficial because the seal can be made from a lower strength material that may be lower cost, have higher temperature capability, be more manufacturable, and/or more wear-resistant. Additionally, the seal is less susceptible to distortion or breakage, which can cause leakage of gas past the seal 310 and/or liberation of the seal. As compared to the seal 210, the seal 310 is more wear-tolerant and may be less susceptible to high cycle fatigue (HCF).

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined between first and second components, the seal comprising:
a single solid annular member having a substantially D-shaped cross section with a solid cross-sectional shape, the single solid annular member configured to provide a seal interface at each of the first and second components, wherein the single solid annular member has a first surface and a second surface joined by a curved section at one side and a third surface on another side, the first surface being configured to seat directly against the first component and the second surface being configured to seat directly against the second component and wherein the third surface provides a reaction surface to transfer a seating bias to the seal.

2. The seal of claim 1, wherein the seal is formed from a nickel-base alloy.

3. The seal of claim 1, further comprising:
a coating applied to the single solid annular member.

4. The seal of claim 1, further comprising:
a sheath covering the portion of the member.

5. The seal of claim 1, wherein the single solid annular member defines a gap at opposed ends thereof.

6. The seal of claim 5, further comprising a bridging seal disposed adjacent the single solid annular member and covering the gap.

7. The seal of claim 6, wherein the bridging seal is substantially flat.

8. A system, comprising:
a first component including a first surface;
a second component disposed adjacent the first component with the first and second components defining a seal cavity therebetween, the second component including a ramped second surface, wherein the ramped second surface forms an angle of less than 90 degrees with respect to the first surface; and
a seal disposed in the seal cavity, wherein the seal has a first surface and a second surface joined by a curved section;
wherein the second surface of the seal is configured to slide on the second ramped surface without substantial deflection thereof during relative movement of the first component and the second component toward or away from one another, wherein the seal is a single solid annular member having a substantially D-shaped cross-section with a solid cross-sectional shape, the single solid annular member provides a seal interface at each of the first and second components, wherein the single solid annular member has a first surface and a second surface joined by a curved section at one side and a third surface on another side directed to fluid pressure, the first surface seating directly against the first component and the second surface seating directly against the second component and wherein the third surface provides a reaction surface to transfer a seating bias to the seal.

9. The seal of claim 8, wherein the seal has a substantially solid u-shaped cross-section along at least a portion thereof.

10. The system of claim 8, wherein the first surface and the second surface are curved.

11. The seal of claim 1, wherein the first surface and the second surface are curved.

* * * * *